United States Patent
Moffett

(10) Patent No.: US 6,203,711 B1
(45) Date of Patent: Mar. 20, 2001

(54) METHOD FOR TREATMENT OF SUBSTANTIALLY AQUEOUS FLUIDS DERIVED FROM PROCESSING INORGANIC MATERIALS

(75) Inventor: Robert Harvey Moffett, Landenberg, PA (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 09/316,600

(22) Filed: May 21, 1999

(51) Int. Cl.$^7$ .................................................. C02F 1/56
(52) U.S. Cl. .......................... 210/725; 209/5; 210/727; 210/728; 210/730; 210/734; 210/731; 210/735; 210/736
(58) Field of Search ............... 162/164.1, 164.3, 162/164.6, 168.1, 168.2, 168.3, 175, 181.1, 181.4, 181.6, 181.8, 181.5, 183, 189; 209/5; 210/710, 725, 727, 728, 730, 731, 734, 735, 736

(56) References Cited

U.S. PATENT DOCUMENTS

| | | | |
|---|---|---|---|
| 4,923,629 | 5/1990 | Hasegawa et al. | 252/181 |
| 4,927,498 | 5/1990 | Rushmere | 162/168.3 |
| 4,933,087 | 6/1990 | Markham, Jr. et al. | 210/626 |
| 4,954,220 | 9/1990 | Rushmere | 162/181.6 |
| 5,127,994 | 7/1992 | Johansson | 162/168.3 |
| 5,174,903 | 12/1992 | Miller | 210/725 |
| 5,178,770 * | 1/1993 | Chung | 210/705 |
| 5,204,452 | 4/1993 | Dingilian et al. | 530/420 |
| 5,269,939 | 12/1993 | Laurent et al. | 210/705 |
| 5,278,284 | 1/1994 | Lusk et al. | 530/305 |
| 5,393,435 | 2/1995 | Deans et al. | 210/714 |
| 5,482,693 | 1/1996 | Rushmere et al. | 423/328.1 |
| 5,496,440 | 3/1996 | Carre et al. | 162/168.3 |
| 5,496,572 | 3/1996 | Rudden | 426/74 |
| 5,569,385 | 10/1996 | Laurent et al. | 210/705 |
| 5,603,805 * | 2/1997 | Andersson et al. | 162/168.3 |
| 5,620,629 | 4/1997 | Salmen et al. | 252/180 |
| 5,626,721 | 5/1997 | Rushmere et al. | 162/181.6 |
| 5,653,886 * | 8/1997 | Kerr et al. | 210/727 |
| 5,658,462 | 8/1997 | Hopkins et al. | 210/633 |
| 5,667,697 | 9/1997 | Salmen et al. | 210/727 |
| 5,695,647 | 12/1997 | Carbonell et al. | 210/724 |
| 5,725,780 * | 3/1998 | Carpenter et al. | 210/728 |
| 5,807,496 * | 9/1998 | Guerro | 252/175 |
| 5,846,384 * | 12/1998 | Schöld et al. | 162/175 |
| 5,858,174 * | 1/1999 | Persson et al. | 162/164.1 |

FOREIGN PATENT DOCUMENTS

| | | |
|---|---|---|
| 0 471 408 A1 | 8/1991 | (EP). |
| 0 765 844 A1 | 4/1997 | (EP). |
| 8-322547 | 12/1996 | (JP). |
| WO 89/06637 | 7/1989 | (WO). |
| WO 91/07350 | 5/1991 | (WO). |
| WO 91/07351 | 5/1991 | (WO). |
| WO 94/05595 | 3/1994 | (WO). |

OTHER PUBLICATIONS

Tiande Cai et al., Stabilization of Poultry Processing By–Products and Poultry Carcasses Through Direct Chemical Acidification, *Bioresource Technology* 52, pp. 69–77, 1995.

G. D. Najafpour et al., Biological Conversion of Poultry Processing Waste to Single Cell Protein, *Bioresource Technology*, 48, pp. 65–70, 1994.

* cited by examiner

Primary Examiner—Peter A. Hruskoci

(57) ABSTRACT

A process is provided which can be used, for example, to clarify substantially aqueous fluids and separate solids from the fluid. The process comprises combining the fluid with a composition which comprises an anionic silica-based colloid having an S value of less than 50% and a cationic organic polymer.

23 Claims, No Drawings

METHOD FOR TREATMENT OF SUBSTANTIALLY AQUEOUS FLUIDS DERIVED FROM PROCESSING INORGANIC MATERIALS

BACKGROUND OF THE INVENTION

1. Field of the Invention

This invention relates to a process for clarification of substantially aqueous fluids, such as process streams, and more particularly to separation of particulate materials from inorganic materials and mineral processing operations, such as processing of ores, clays, coal, as well as byproducts from metal and metal salt processing.

2. Description of the Related Art

Aqueous fluids are present in many industrial processing operations such as mining and mineral processing, for example, as aqueous streams containing dispersed solids that cannot be separated completely by simple sedimentation or filtration. The presence of the dispersed solids causes the fluids to be turbid, i. e., appear cloudy and/or opaque. Examples of such fluids include wastewaters from mining of ores, minerals, and precious metals, certain chemical processing plants, e. g., production of clays, alumina, pigments and paints, as well as polishing operations e. g., sheet metal and silicon wafers. Large volumes of aqueous fluids, many of which are turbid, are typically circulated through processing operations for these industries.

Problems associated with such fluids include corrosion and scaling of equipment, for example, pumping systems; loss of product values in the suspended solids; and low product quality due to poor solids removal. Such fluids may need to be treated prior to discharge from a plant or if the water content of the fluid is to be recycled.

Any aqueous fluid being discharged from a manufacturing plant to a public water system must meet local requirements. While there has been much attention devoted to the general area of wastewater treatment and, more specifically treatment of municipal wastewaters, such treatment methods may not be effective for industrial processing wastewaters in terms of cost or providing acceptable water quality. Therefore, there is a need for an efficient, cost-effective system to clarify wastewater fluids present in inorganic and mineral processing.

SUMMARY OF THE INVENTION

The present invention provides a process, which can be used for example, for clarification of a substantially aqueous fluid comprising suspended particulate material. The process comprises:

(a) contacting with the aqueous fluid:
  (1) an anionic silica-based colloid having an S value of less than 50%; and
  (2) an organic polymer selected from the group consisting of a cationic organic polymer, an amphoteric organic polymer, and mixtures thereof; whereby flocculated material is produced; and optionally
(b) separating the flocculated material from the fluid.

DETAILED DESCRIPTION

Materials

Aqueous Fluid

In the process of this invention, the aqueous fluid to be treated can be from any inorganic materials or minerals processing plant that produces a substantially aqueous fluid comprising suspended particulate material. This process is useful in treating aqueous fluids in conventional mining and mineral processing operations including aqueous fluids derived from mining of precious metals, base metals, ores, clays, and coal. This process is useful in treating fluids derived from the beneficiation of ores. This process is useful to treat fluids derived from drilling operations, such as oil drilling, including drilling muds, which may also contain suspended organic materials. Further, this process is useful in treating aqueous fluids containing suspended materials derived from processing of inorganic materials such as clays, alumina, pigments and dyes. Still further, this invention is useful in treating aqueous fluids derived from polishing operations such as polishing of sheet metal, for example, steel, and silicon wafers.

While the aqueous fluid can generally be considered as a stream containing suspended material flowing through a plant operation, the fluid can also be considered a stationary fluid, for example a still pond.

It should be recognized that the suspended particulate material in the aqueous fluid to be treated, especially fluids derived from mining and mineral processing operations, may be comprised of inorganic or organic components, or mixtures thereof. For example, organic components may include humates, which are naturally found in soils and mined materials.

Anionic Silica-Based Colloid

Anionic silica-based colloids useful in the process of this invention should have an S value of less than about 50%, as defined in Iler and Dalton in *J. Phys. Chem.*, 1956, vol. 60, pp. 955–957. The S value is a measure of the degree of aggregate or microgel formation and a lower S value indicates a higher microgel content and is determined by the measure of the amount of silica, in weight percent, in the disperse phase. The disperse phase consists of particles of anhydrous silica together with any water that is immobilized at the surface or in the interior of the particles.

Examples of anionic silica-based colloids which can be used in the process of this invention include polysilicic acid, polysilicic acid microgels, polysilicate microgels, polyaluminosilicate microgels, colloidal silicas with a high microgel content, and mixtures thereof, such that the colloid has an S value of less than about 50% and preferably less than 40%. These colloids are distinct from many colloidal silicas in that these colloids usually have surface areas of 1000 $m^2/g$ or higher and the microgels are comprised of small 1 to 2 nm diameter silica particles linked together into chains and three-dimensional networks.

Polysilicate microgels, also known as active silicas, have $SiO_2:Na_2O$ ratios of 4:1 to about 25:1, and are discussed on pages 174–176 and 225–234 of "The Chemistry of Silica" by Ralph K. Iler, published by John Wiley and Sons, N.Y., 1979. Polysilicic acid generally refers to those silicic acids that have been formed and partially polymerized in the pH range 1–4 and comprise silica particles generally smaller than 4 nm diameter, which thereafter polymerize into chains and three-dimensional networks. Polysilicic acid can be prepared, for example, in accordance with the methods disclosed in U.S. Pat. No. 5,127,994, incorporated herein by reference.

Polyaluminosilicates are polysilicate or polysilicic acid microgels in which aluminum has been incorporated within the particles, on the surface of the particles, or both. Polysilicate microgels, polyaluminosilicate microgels and polysilicic acid can be prepared and stabilized at acidic pH. Polyaluminosilicates are particularly useful at low pH.

The polysilicate microgels and polyaluminosilicate microgels useful in this invention are commonly formed by the activation of an alkali metal silicate under conditions described in U.S. Pat. Nos. 4,954,220 and 4,927,498, incorporated herein by reference. However, other methods can also be employed. For example, polyaluminosilicates can be formed by the acidification of silicate with mineral acids containing dissolved aluminum salts as described in U.S. Pat. No. 5,482,693, incorporated herein by reference. Alumina/silica microgels can be formed by the acidification of silicate with an excess of alum, as described in U.S. Pat. No. 2,234,285, incorporated herein by reference.

In the process of this invention, better results have been generally found to occur with larger microgel sizes, generally greater than 10 nm size microgels give the best performance. Microgel size can be increased by any method known to one skilled in the art, such as aging of the microgel, changing pH, or changing concentrations during microgel formation.

In addition to silica microgels, silica sols such as those described in European patents EP 491879 and EP 502089 can also be used for the anionic silica-based colloid in this invention. In EP 491879 is described a silica sol having an S value in the range of 8 to 45% wherein the silica particles have a specific surface area of 750 to 1000 m$^2$/g, which have been surface modified with 2 to 25% alumina. In EP 502089 is described a silica sol having a molar ratio of $SiO_2$ to $M_2O$, wherein M is an alkali metal ion and/or an ammonium ion of 6:1 to 12:1 and containing silica particles having a specific surface area of 700 to 1200 m$^2$/g.

The anionic silica-based colloids are added in amounts ranging from about 1 to 7500 parts per million (ppm) by weight, on a $SiO_2$ basis, based on the solution weight of the aqueous fluid. The preferred range of addition is from about 1 to 5000 ppm, more preferably 2 to 2000 ppm.

Organic Polymers

Organic polymers useful in the process of this invention include both cationic ad amphoteric polymers and mixtures thereof. High molecular weight and low molecular weight polymers can be used.

High molecular weight cationic organic polymers include natural and synthetic cationic polymers. Natural cationic polymers include cationic starch, cationic guar gum, and chitosan. High molecular weight synthetic cationic polymers typically have number average molecular weights greater than 1,000,000, such as cationic polyacrylamide. Cationic starches include those formed by reacting starch with a tertiary or quaternary amine to provide cationic products with a degree of substitution of from 0.01 to 1.0, containing from about 0.01 to 1.0 wt % nitrogen. Suitable starches include potato, corn, waxy maize, wheat, rice and oat. Preferably the high molecular weight cationic organic polymer is polyacrylamide.

Low molecular weight cationic organic polymers have a number average molecular weight in the range between about 2,000 to about 1,000,000, preferably between 10,000 and 500,000. The low molecular weight polymer can be polyethylene imine, polyamines, polycyandiamide formaldehyde polymers, amphoteric polymers, diallyl dimethyl ammonium chloride polymers, diallylaminoalkyl (meth) acrylate polymers and dialkylaminoalkyl (meth)acrylamide polymers, a copolymer of acrylamide and diallyl dimethyl ammonium chloride, a copolymer of acrylamide and diallylaminoalkyl (meth)acrylates, a copolymer of acrylamide and dialkyldiaminoalkyl (meth)acrylamides, and a polymer of dimethylamine and epichlorohydrin. These have been described in U.S. Pat. Nos. 4,795,531 and 5,126,014.

Amphoteric organic polymers include amphoteric starches, guar gums and synthetic amphoteric high molecular weight organic polymers.

The organic polymer is added in an amount ranging from about 0.2 to 5000 ppm based on the solution weight of the aqueous fluid. The preferred range is from about 1 to 2500 ppm. Preferably the organic polymer is a high molecular weight cationic organic polymer such as polyacrylamide since faster settling rates can be achieved relative to using a low molecular weight polymer.

Options

Optionally, metal salts can be used in the process of this invention. Iron and aluminum are particularly useful. Anionic and non-ionic polymers may also optionally be used. Use of optional components may enhance flocculation and/or water release from the flocculated material.

Process

The process of this invention involves treatment of an aqueous fluid derived from industrial processing operations to reduce suspended particulate material, i. e., solids, and optionally to separate the solids from the aqueous fluid, thereby clarifying the fluid.

An aqueous fluid, comprising suspended particulate material, for example, derived from an industrial processing operation, is contacted with an anionic silica-based colloid and an organic polymer, wherein the anionic silica-based colloid has an S value of less than 50%, preferably less than 40%. The organic polymer can be either a cationic or an amphoteric polymer. Further, a metal salt, especially an iron or aluminum salt can be optionally added. These reagents, anionic silica-based colloid, organic polymer and optional metal salt, can be contacted with the fluid in any sequential order, or one or more can be contacted simultaneously with the aqueous fluid. The combination of adding anionic silica-based colloid and organic polymer produces flocculated material.

As defined herein, to flocculate means to separate suspended particulate materials, from a fluid comprising particulate materials wherein the materials become aggregated and separate to the top or bottom of the fluid in which the materials had previously been suspended. Flocculation produces a flocculated material, which, if desired, can be physically separated from the fluid. In the present invention, it is desirable to maximize the size of the flocculated material in order to facilitate removal of this material from the fluid.

The aqueous fluid should have a pH of less than 11, preferably less than 10.5. Should the aqueous fluid have a pH greater than 11, then an acid should be added to the fluid prior to treatment to reduce the pH to less than 11 to produce a pH-adjusted fluid. While any acid can be used to reduce the pH of the fluid, typically mineral acids, such as sulfuric acid, hydrochloric acid and nitric acid are preferred. Other useful acids include, but are not limited to, carbon dioxide, sulfonic acids, and organic acids, such as carboxylic acids, acrylic acids, acidic anionic silica-based inorganic colloids, partially neutralized acids in which one or more protons are replaced with a metal or ammonium ion, and mixtures thereof. Acidic anionic silica-based colloids include, but are not limited to, low molecular weight polysilicic acid, high molecular weight polysilicic acid microgels, acidic polyaluminosilicates and acid stabilized polysilicate microgels. Examples of acid stabilized polysilicate microgels are described in U.S. Pat. Nos. 5,127,994 and 5,626,721. When an acidic anionic silica-based colloid is used to reduce pH of the fluid to less than pH 11, no additional source of acid or anionic inorganic colloid may be needed to reduce pH or to use with an organic polymer to flocculate the solids in the pH-adjusted fluid.

The flocculated solids can be separated from the treated fluid by conventional separation processes such as sedimentation, flotation, filtering, centrifugation, decantation, or combinations of such processes. If the clarified fluid meets local environmental standards, it may be safely discharged to a public water system. Alternatively, if desired, the fluid may be recycled to the operation's process water, minimizing the need for adding fresh water, thereby reducing the environmental impact and improving the economics of the process. The separated solids can subsequently be recovered and may be used in applications depending on the source of the aqueous fluid.

Test Methods

S value is the percent by weight of silica in the disperse phase and is calculated from the relative viscosity of the sol and the densities of water and silica at pH 2 in accordance with Iler and Dalton, *J. Phys. Chem.*, 1956, vol. 60, pp. 955–957.

Turbidity is measured using a Hach Ratio Turbidimeter, available from Hach Company, Loveland, Colo., and is provided in Nephelometric turbidity units, NTU.

EXAMPLES

Example 1

A 1 wt % clay suspension in water was prepared using Ansilex 93 clay from Engelhard Corp., Iselin, N.J. Various silica sols were added to the clay suspension while being mixed at medium speed on a Fisher Scientific model #120MR magnetic stirrer, available from Fisher Scientific, Pittsburgh, Pa. 1 minute after the silica sol was added, 10 ppm of polydiallyldimethyl ammonium chloride (polydadmac), a low molecular weight cationic polymer, was added to the clay slurry. Mixing was stopped 1 minute after the polydadmac solution was added and the flocculated clay suspension was transferred to 250 ml graduate cylinder. The turbidity of the clear water above the solids was recorded at 2 and 5 minutes after the suspension was transferred to the cylinder.

TABLE 1

| Silica Sol | Wt $SiO_2$, ppm | S value % | Turbidity 2 min. | Turbidity 5 min. |
|---|---|---|---|---|
| A | 20 | ~80 | >200 | >200 |
| A | 40 | ~80 | >200 | >200 |
| B | 20 | 30 | 93 | 60 |
| B | 40 | 30 | 34 | 19 |
| C | 20 | 15 | 59 | 40 |
| C | 40 | 15 | 46 | 33 |

Silica sol A=4 nm disperse particles from Nalco Chemical Company, Naperville, Ill. Surface area~750 $m^2/g$.

Silica sol B=BMA-670 silica microgel from Eka Chemicals AB, Bohus, Sweden. Surface area~700 $m^2/g$. Surface partially aluminated. $SiO_2/Al_2O_3$ wt. ratio of 24/1.

Silica Sol C=Particol® BX polyaluminosilicate microgel from E. I. duPont de Nemours and Company, Inc., Wilmington, Del. Surface area~1300 $m^2/g$. Surface and interior partially aluminated. $SiO_2/Al_2O_3$ wt ratio 780/1

From Table 1 it can be seen that silica sols having an S value of less than 50% can be used to reduce turbidity in waters containing suspended minerals compared to silica sols with higher S values comprised of discrete silica particles.

Example 2

A 1 wt % clay suspension in water was prepared using Ansilex 93 clay from Engelhard Corp. Particol® MX silica microgel solution having an S value of approximately 15% was added to the clay suspension while being mixed at medium speed on a magnetic stirrer. 1 minute after the silica sol was added, 4 ppm of polydadmac or Percol® 182 high molecular weight cationic polyacrylamide from Ciba Specialty Chemicals, Basel, Switzerland (see Table 2 for details), was added to the clay slurry. Mixing was stopped 1 minute after the cationic polymer solution was added and the flocculated clay suspension was transferred to 250 ml graduate cylinder. The volume of the settled solids was recorded at 2 and 5 minutes after the suspension was transferred to the cylinder.

TABLE 2

| Cationic Polymer | Particol® MX, ppm $SiO_2$ | Solids volume, ml 2 min. | Solids volume, ml 5 min. |
|---|---|---|---|
| Polydadmac | 4 | 170 | 100 |
| Polydadmac | 10 | 190 | 110 |
| Percol® 182 | 4 | 30 | 20 |
| Percol® 182 | 10 | 20 | 20 |
| Percol® 182 | 20 | 20 | 15 |
| Percol® 182 | 40 | 15 | 15 |

As can be seen in Table 2, both high and low molecular weight cationic organic polymers are effective at reducing suspended solids when used with Particol® MX. The high molecular weight polymer, Percol® 182, provided a faster settling rate as indicated by the lower solids volume.

Example 3

A sample of coal fines suspended in water, available from Consol, Inc., Library, Pa., containing 1.58 grams of solids per 100 ml was mixed with Percol® 292 medium molecular weight cationic polyacrylamide from Ciba Specialty Chemicals, for 1 minute on a magnetic stirrer at medium speed. Particol® BX available from DuPont having an approximate S value of 9% was then added and mixed for 1 minute. The flocculated coal fines suspension was then transferred to a 500 ml graduated cylinder. The solids volume was recorded 3, 5 and 10 minutes after the suspension was added to the cylinder. As a comparison the low S value silica sol was replaced with Percol® 90L high molecular weight anionic polyacrylamide from Ciba Specialty Chemicals.

TABLE 3

| | Reagents, ppm | | | Solids volume, ml | | |
|---|---|---|---|---|---|---|
| Run | Percol® 292 | Particol® BX | Percol® 90L | 3 min. | 5 min. | 10 min. |
| 1 | 1.6 | 0.8 | 0 | 70 | 55 | 35 |
| 2 | 2.4 | 0 | 1.6 | 90 | 75 | 63 |

Table 3 shows use of a low S value anionic silica-based colloid, Particol® BX, allowed use of less cationic organic polymer than when an anionic polymer, Percol® 90L, was used. Better results, that is, faster settling rates were obtained with the Particol® BX anionic colloid even with using a larger amount of the anionic polymer.

Example 4

An acidic metal chloride stream produced as a byproduct from the production of titanium dioxide by the chloride process comprising iron chlorides as the major component was treated with sodium carbonate in accordance with U.S. Pat. No. 5,518,633 to produce a slurry comprising iron carbonate and iron hydroxide at about 7% solids. Turbidity of this slurry was >200. The slurry was treated with Particol® MX silica microgel solution and cationic polymers as detailed below. The results are provided in Table 4.

Particol® MX silica microgel solution was added to 250 ml of the slurry comprising iron carbonate and iron hydroxide while mixing on a magnetic stirrer at medium speed. 30 seconds after addition of the silica microgel solution, a cationic organic polymer as noted in Table 4, was added, causing the suspended solids to flocculate. The flocculated slurry was transferred to a 250 ml graduated cylinder 30 seconds after the polymer was added. The distance the flocculated solids settled was recorded after 1 and 5 minutes. At 5 minutes, the clear supernatant above the solids was sampled and the turbidity measured.

TABLE 4

| Particol ® MX | Cationic Polymer, ppm | | | Inches Settled | | Turbidity (NTU) |
|---|---|---|---|---|---|---|
| SiO$_2$, ppm | A | B | C | 1 min. | 5 min. | 5 min. |
| 120 | | | | 2.5 | 7 | 24 |
| 40 | 8 | | | 7.75 | 8.25 | 70 |
| 80 | 8 | | | 8.25 | 8.75 | 24 |
| 120 | 8 | | | 7.5 | 8.9 | 19 |
| 120 | | 8 | | 1.5 | 5.7 | 14 |
| 120 | | 16 | | 2 | 6 | 11 |
| 120 | | 40 | | 2.5 | 6.5 | 11 |
| 120 | | | 8 | 2.75 | 7 | 8 |
| 120 | | | 16 | 4.5 | 7.5 | 11 |
| 120 | | | 40 | 8 | 9.1 | 26 |
| 40 | | | 8 | 6.25 | 8 | 35 |

Cationic polymers:
A: Percol® 182 high molecular weight cationic polyacrylamide, available from Ciba Specialty Chemicals.
B: BMB-40 cationic potato starch, available from Eka Chemicals, Bohus, Sweden.
C: CP-13 cationic guar gum, available from Rhone-Poulenc, Marietta, Ga.

In the absence of treatment with the Particol® MX microgel solution and cationic polymer, settling rates ranged from 0.05 to 0.3 inches per minute. As can be seen from Table 4, solids settled more rapidly, all runs settled at rates of greater than 1 inch per minute, when the process of the invention was followed. Further, Table 4 shows turbidity improved when a low S value anionic silica-based colloid was used in combination with a cationic polymer to remove iron-containing solids from an aqueous stream.

While treatment with a high level of Particol® MX alone showed improvement in settling rate and turbidity, the settled product did not hold together when subjected to shear conditions and the solids became redispersed. When the cationic polymer was present, the flocculated solids held together when subjected to shear conditions.

Example 5

Polysilicic acid microgel solution (PSA) was prepared by in accordance with U.S. Pat. No. 4,927,498. After aging the 1 wt % SiO$_2$ solution for >24 hours, the surface of the microgels were partially aluminated by mixing 5.4 grams of dilute sodium aluminate solution containing 1.3 wt % Al$_2$O$_3$ with 100 grams of the 1 wt % PSA. The partially aluminated polysilicic acid microgel solution (PAS, for polyaluminosilicate) was used as described below.

A 1 wt % humate suspension was prepared using water from a Florida mineral sands dredge pond. Various amounts of PAS were added to 1000 ml of humate suspension while being mixed at 500 rpm with a propeller blade mixer. One minute after the PAS was added, 40 ppm Al$_2$O$_3$ as alum, was added. One minute later, 2.1 ppm of high molecular weight cationic polyacrylamide (CPAM) containing 20 wt % cationic moieties was added. One minute after the CPAM was added, the flocculated humate suspension was transferred to a Canadian Standard Freeness tester as described in TAPPI standard T 227 om-94, in which the side discharge orifice had been capped. The suspension was allowed to drain and the total volume of water released from the flocculated humate suspension was recorded after draining for 1, 2 and 5 minutes. After 5 minutes the turbidity of the drained water was measured.

TABLE 5

| PAS | Volume of water, ml | | | Turbidity |
|---|---|---|---|---|
| SiO$_2$, ppm | 1 min. | 2 min. | 3 min. | (NTU) |
| 0 | 140 | 170 | 235 | 49 |
| 50 | 210 | 300 | 480 | 11 |
| 100 | 260 | 390 | 600 | 11 |
| 150 | 330 | 470 | 690 | 13 |

Table 5 results show addition of an aluminated polysilicic acid or polyaluminosilicate microgel (PAS) provided improved flocculation as was seen by a faster drainage rate of water, larger volume of drained water over time, from a humate suspension. There is corresponding improvement in the turbidity of the water, i. e., clearer effluent due to lower turbidity upon the addition of PAS.

What is claimed is:

1. A process for reducing suspended particulate material in a substantially aqueous fluid, derived from inorganic material or mineral processing, comprising contacting said fluid with: (a) an anionic silica-based colloid having an S value of less than about 50%; and (b) a polymer selected from the group consisting of a cationic organic polymer, an amphoteric organic polymer, and mixtures thereof to produce a flocculated material including said suspended particulate material.

2. The process of claim 1 wherein the anionic silica-based colloid is present in said stream in an amount of 1 to 7500 ppm (on a SiO$_2$ basis) based on the total weight of said fluid and the polymer is present in said fluid in an amount of 0.2 to 5000 ppm, based on the total weight of said fluid.

3. The process of claim 1 wherein the anionic silica-based colloid having an S value of less than about 50% is selected from the group consisting of polysilicic acid, polysilicic acid microgels, polysilicate microgels, polyaluminosilicate microgels, colloidal silicas with a high microgel content, and mixtures thereof.

4. The process of claim 1 wherein the anionic silica-based colloid is a silica sol having an S value in the range of 8 to 45% wherein the silica particles have a specific surface area of 750 to 1000 m$^2$/g, which have been surface modified with 2 to 25% alumina.

5. The process of claim 1 wherein the anionic silica-based colloid is a silica sol having a molar ratio of SiO$_2$ to M$_2$O, wherein M is an alkali metal ion and/or an ammonium ion of 6:1 to 12:1 and containing silica particles having a specific surface area of 700 to 1200 m$^2$/g.

6. The process of claim 1 wherein the polymer is a cationic organic polymer.

7. The process of claim 6 wherein the cationic polymer is a high molecular weight polymer having a number average molecular weight greater than 1,000,000.

8. The process of claim 7 wherein the high molecular weight cationic organic polymer is selected from the group consisting of cationic polyacrylamide, cationic starch, cationic guar gum, chitosan, and mixtures of two or more thereof.

9. The process of claim 8 wherein said polymer is cationic polyacrylamide.

10. The process of claim 6 wherein said polymer is a carbohydrate.

11. The process of claim 1 wherein the polymer is an amphoteric organic polymer.

12. The process of claim 1 wherein said process comprises, before said contacting, adjusting the pH of said fluid to less than about pH 11.

13. The process of claim 12 wherein said polymer is cationic polyacrylamide.

14. The process of claim 13 wherein said process further comprises separating said flocculated material from said fluid.

15. The process of claim 12 wherein said polymer is a carbohydrate.

16. The process of claim 15 wherein said process further comprises separating said flocculated material from said fluid.

17. The process of claim 1 wherein said substantially aqueous fluid derived from inorganic or mineral processing is selected from the group consisting of fluids derived from mining of precious metals, base metals, ores, clays, or coal; fluids derived from the beneficiation of ores; fluids derived from drilling operations; fluids derived from processing of clays, alumina, pigments or dyes; and fluids derived from polishing operations of sheet metal or silicon wafers.

18. The process of claim 17 wherein said aqueous fluid is derived from mining of precious metals, base metals, ores, clays, or coal; and contains humates.

19. A process for reducing suspended particulate material in a substantially aqueous fluid derived from inorganic material or mineral processing, comprising: (a) adjusting the pH of said fluid to less than about pH 11 to produce a pH-adjusted fluid; (b) contacting said pH-adjusted fluid with a composition to produced a flocculated material including said suspended particulate material; and (c) separating said flocculated material from said pH-adjusted fluid wherein said composition comprises (1) an anionic silica-based colloid having an S value of less than about 50%; and (2) a polymer selected from the group consisting of cationic polyacrylamide, cationic starch, cationic guar gum, cationic chitosan, amphoteric organic polymer, and mixtures of two or more thereof.

20. The process of claim 19 wherein said anionic silica-based colloid is present in said pH-adjusted fluid in an amount of 1 to 7500 ppm (on a $SiO_2$ basis) based on the total weight of said substantially aqueous fluid and the polymer is present in said pH-adjusted fluid in an amount of 0.2 to 5000 ppm, based on the total weight of said substantially aqueous fluid.

21. The process of claim 20 wherein the anionic silica-based colloid having an S value of less than about 50% is selected from the group consisting of polysilicic acid, polysilicic acid microgels, polysilicate microgels, polyaluminosilicate microgels, colloidal silicas with a high microgel content, and mixtures thereof.

22. The process of claim 20 wherein the polymer is an amphoteric organic polymer.

23. The process of claim 20 wherein said polymer is cationic polyacrylamide.

* * * * *